Figure 1:
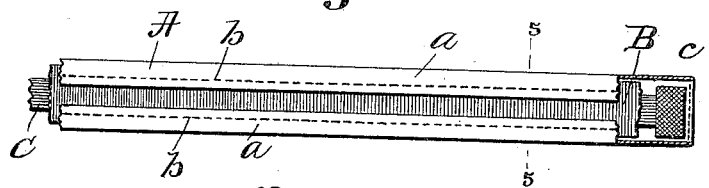

No. 672,310. Patented Apr. 16, 1901.
F. O. C. BROWN.
GARMENT STAY.
(Application filed Jan. 24, 1900.)
(No Model.) 2 Sheets—Sheet 1.

Witnesses
Marcus L. Byng
Esther V. Byng

Inventor
Fred O. C. Brown
by Mason Fenwick Lawrence
his Attorney

No. 672,310. Patented Apr. 16, 1901.
F. O. C. BROWN.
GARMENT STAY.
(Application filed Jan. 24, 1900.)
(No Model.) 2 Sheets—Sheet 2.
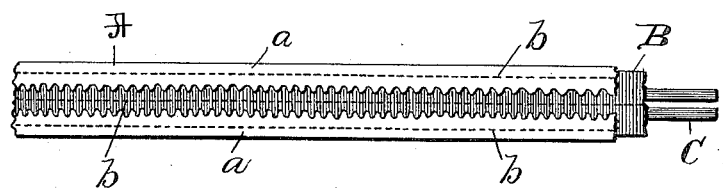
Fig. 13.
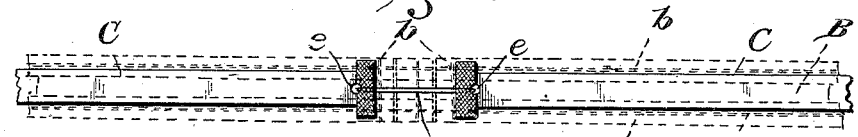
Fig. 14.
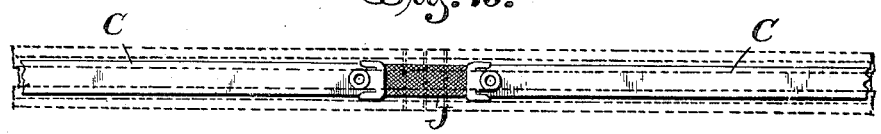
Fig. 15.
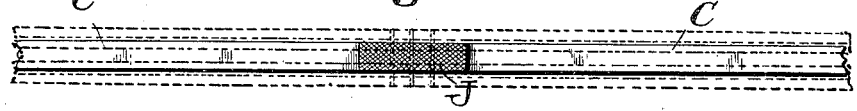
Fig. 16.
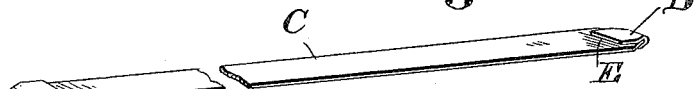
Fig. 17.
Fig. 18.
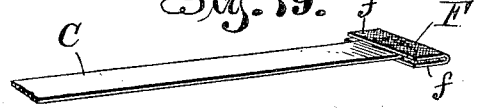
Fig. 19.
Fig. 20.
Witnesses
Marcus L. Byng.
Esther V. Byng.
Inventor
Fred O. C. Brown
by
Mason Fenwick Lawrence
his Attorney
THE NORRIS PETERS CO., PHOTO-LITHO., WASHINGTON, D. C.

UNITED STATES PATENT OFFICE.

FRED O. C. BROWN, OF GRAND RAPIDS, MICHIGAN.

GARMENT-STAY.

SPECIFICATION forming part of Letters Patent No. 672,310, dated April 16, 1901.

Application filed January 24, 1900. Serial No. 2,646. (No model.)

*To all whom it may concern:*

Be it known that I, FRED O. C. BROWN, a citizen of the United States, residing at Grand Rapids, in the county of Kent and State of Michigan, have invented certain new and useful Improvements in Dress-Stays; and I do hereby declare the following to be a full, clear, and exact description of the invention, such as will enable others skilled in the art to which it appertains to make and use the same.

My invention has relation to the stays used for stiffening the waists of dresses and other garments, and has for one object to provide an improved article of this description which will be neat and sightly in appearance, economical in construction, and reliable and durable in use.

A special object of my invention is to improve the covering of the stiffener—usually a strip of steel, whalebone, or other suitable material.

A further object is to cheapen the manufacture of the stay.

A further object is to provide improved tips for the stiffeners and improved means for securing such tips.

With these objects in view my invention consists in the improved construction, arrangements, and combination of the several parts of garment-stays, which will be fully described hereinafter and afterward specifically pointed out in the appended claims.

In the accompanying drawings, Figures 1, 2, 3, and 4 are face views of garment-stays made and covered in accordance with my invention. Figs. 5, 6, 7, and 8 are enlarged transverse sectional views through the same on the plane indicated by the broken lines 5 5, 6 6, 7 7, and 8 8 in Figs. 1, 2, 3, and 4. Figs. 9, 10, 11, and 12 are similar transverse sectional views on the same plane, illustrating the manner in which I propose to insert gutta-percha tissue for the purpose of securing the stays in the covers. Fig. 13 is a face view of a stay with two stiffeners. Figs. 14, 15, and 16 are views illustrating forms of couplings or joints for joining stiffeners in endwise series, the covering being shown in dotted lines. Figs. 17, 18, and 19 are views of ends of stiffeners, illustrating my forms of tips for the stiffeners. Fig. 20 is a view of a plain stiffener without tip.

In garment-stays as heretofore made, except when made in sheets side by side, the casings for covering the stiffeners—such as steels, whalebone, &c.—have been usually made by weaving in one piece, generally tubular, with one or more lengthwise pockets. Such coverings are to a greater or less extent elastic, and therefore stretch easily and do not hold the stiffeners as firmly as is desirable. This existing defect is remedied in my invention, in which the casing is made of two longitudinal pieces A and B of cloth or other substantially inelastic material or fabric, the piece A being wider than the piece B and having its two longitudinal edges $a\ a$ folded over the edges of said piece B, as clearly shown in Figs. 1 to 13, and secured thereto by longitudinal rows of stitching $b\ b$ near its edges, the stitches passing through both pieces and firmly holding them together in proper relation to each other.

Figure 5:
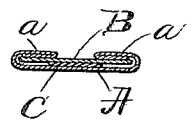
Figure 2:
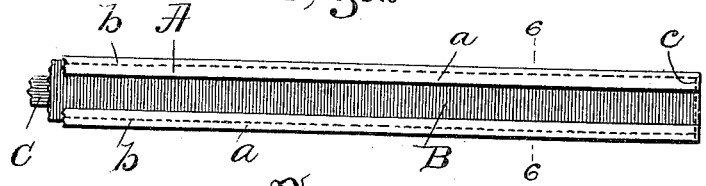
Figure 6:
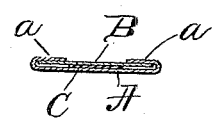
Figure 3:
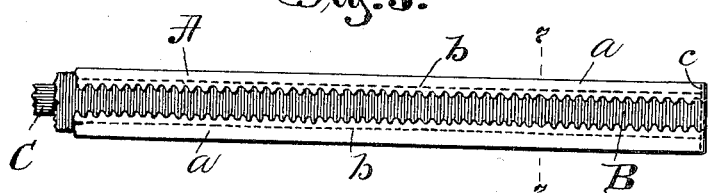
Figure 7:
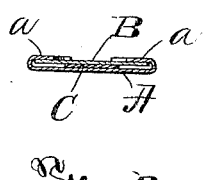
Figure 4:
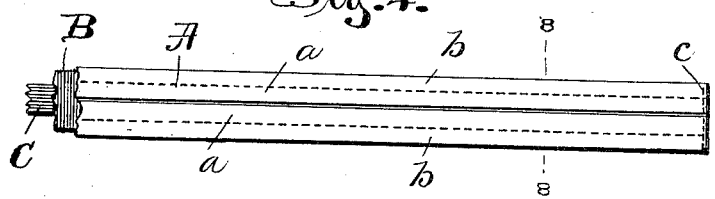
Figure 8:
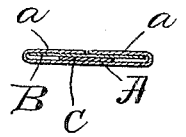
Figure 9:
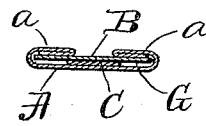

In the casing shown in Figs. 1, 5, and 9 the folded edges $a\ a$ of piece A are folded under, forming a triple thickness of the outer piece to receive the stitching and leaving a smooth edge inside of the lines of stitching. In this respect it differs from the construction shown in Figs. 2, 6, and 10, 3, 7, 11, and 13, and 4, 8, and 12, in which the edges are simply folded over once, the edges in Figs. 2 and 4 being raw and plain and those in Figs. 3 and 13 pinked or otherwise ornamented. In the forms shown in Figs. 1, 2, and 3 the edges $a\ a$ are simply folded over the edges of piece B, leaving the latter exposed; but in the form shown in Fig. 4 the edges $a\ a$ are folded over far enough to meet and entirely cover the piece B.

In Figs. 1 to 8 the casings are secured by stitching only, and after the stiffeners C have been properly placed in the casings rows of stitching $c$ are made across the casing outside of and contiguous to the ends of the stiffeners to prevent their longitudinal displacement. The stiffeners constructed as shown in Fig. 20, without tips on the ends, are liable to tear out or cut the casings or the cross-stitches, and thereby not only spoil the casing, but endanger the wearer of the garment. To obviate this difficulty, I have provided tips D, as shown in Figs. 17, 18, and 19. In Fig. 17 the tip consists of a small strip of metal bent over the end of the stiffener, as E, secured thereto by glue, cement, or other adhesive material. In Fig. 18 substantially the same tip is shown at E'; but it is secured to the stiffener by punching it into a hole $e$ in the stiffener, with or without the interposition of adhesive material. In both instances the tip is of less width than the stiffener, and in Fig. 19 I show a cover F for the tip comprising a strip of fabric wider than the stiffener, folded over its end and over the attached tip and glued or cemented thereto, the edges $f\,f$ of the tip-cover projecting laterally beyond the sides of the stiffener. In this figure the outline of the tip is shown in dotted lines. With a tip and cover on each end a stiffener may be placed in a casing and be securely held therein by the longitudinal stitching only, said stitching passing through the projecting edges $f\,f$ of the tip-cover F and securely holding the tip and stiffener, thus dispensing with the cross-stitching.

Figure 11:
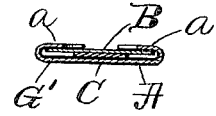
Figure 10:
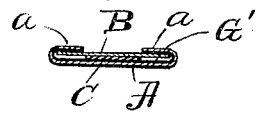
Figure 12:
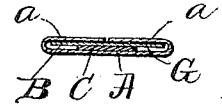

I sometimes supplement the stitching by the use of the well-known gum or gutta-percha tissue or dispense entirely with the stitching, said tissue being arranged as shown in Figs. 9 to 12. In Fig. 9 the piece B of Figs. 1, 2, 3, and 4 is lined on the inside with a layer of tissue G, and in Fig. 12 the layer G is placed on the outside of piece B. In Figs. 10 and 11 the piece A is lined with tissue, as at G', before folding it over the piece B of the casing. In either form the material from which pieces A and B are cut may be lined with the tissue before cutting into strips. After the prepared strips are properly folded with the stiffener inside, the stay is passed through a heated ironing-machine, causing the tissue to soften and cause the parts to be rigidly secured together, before or after which the edges may or may not be stitched, as may be deemed desirable.

In order to facilitate and cheapen the manufacture of my improved stays, I propose to connect the stiffeners together in end-to-end series, as illustrated in Figs. 14, 15, and 16, before inclosing them in casings, so that a long strip of stays will be provided, ready to be cut into proper lengths by transverse cutting between the ends of contiguous stiffeners. In this step I may use various forms of joints for connecting the stiffeners, as shown in Figs. 14, 15, and 16. In Fig. 14 the stiffeners are shown tipped, as in Fig. 19, and with a loop of cord I tied in the holes $e$. In Fig. 15 the connection is made by means of a strip J of fabric eyeleted to the stiffeners. In Fig. 16 a similar strip J is glued or cemented to the stiffeners. The joint shown in Fig. 14 is especially adapted for use where the longitudinal stitching alone is used to secure the stiffeners, and those shown in Figs. 15 and 16 are adapted for use where the cross-stitching is used or where the gum tissue is used, as before described.

By the foregoing description it will be seen that I have provided neat, strong, inelastic, and durable casings for garment-stays and improved means for securing together the various parts composing said stays.

Having thus described my invention, what I claim as new, and desire to secure by Letters Patent of the United States, is—

1. As an improved article of manufacture, a garment-stay comprising a stiffener and a casing or cover therefor, said casing comprising a strip of fabric wider and longer than the stiffener and lying against one face thereof, and another strip of fabric wider than the first lying against the opposite face of the stiffener, the longitudinal edges of the latter strip being folded over the side edges of the first-named strip of fabric covering the raw edges thereof, the two strips of fabric being secured together along the edges of the stiffener and across beyond the ends thereof, substantially as set forth.

2. As an improved article of manufacture, a garment-stay comprising a stiffener and a casing or cover therefor, said casing comprising a strip of fabric wider than the stiffener adjacent to the face thereof, and another strip of fabric wider than the first adjacent to the opposite face of the stiffener, the longitudinal edges of the latter strip being folded over the edges of the first strip, the stiffener being provided with a tip of metal folded over each end, and a fabric tip folded over and secured upon the metal tip with its side edges projecting beyond the edges of the metal tip and stiffener, and the whole secured together by longitudinal rows of stitching, through both strips and through the projecting edges of the fabric tip outside the edges of the stiffener, substantially as described.

3. As an improved article of manufacture, an end-to-end series of dress-stays comprising an end-to-end series of stiffener-strips arranged with spaces between their adjacent ends and inclosed within a continuous tubular cover or casing comprising layers of fabric, the layers of said casing being secured together throughout their extent and between the ends of the strips, whereby complete single stays may be made by cutting through the casing between the individual stiffener-strips, substantially as set forth.

4. As a new article of manufacture, an end-to-end series of garment-stays comprising an end-to-end series of stiffener-strips, arranged with spaces between the adjacent ends, and united by flexible joints extending through said spaces and inclosed in a single bag-like or tubular cover or casing for the whole series comprising layers of fabric, the layers of said casing being secured together throughout their extent and between the ends of the stiffener-strips, whereby complete single stays may be made by cutting through the covering, and said joints, between the stiffener-strips, substantially as set forth.

5. As a new article of manufacture, an end-to-end series of garment-stays comprising an end-to-end series of stiffener-strips, spaced at a distance apart and inclosed in a single tubular cover or casing for the whole series, said casing comprising a strip of fabric wider than the stiffener-strips and lying against one face of the whole series thereof, and another strip of fabric wider than the first lying against the opposite face of the series of stiffeners, the longitudinal edges of the latter strip of fabric being folded over the side edges of the first-named strip of fabric and covering the raw edges thereof, the two strips of fabric being secured together throughout their extent along the edges of the series of stiffener-strips and across the space between the adjacent ends of the individual stiffener-strips, whereby complete single stays may be made by cutting through the casing between the individual stiffener-strips, substantially as set forth.

In testimony whereof I hereunto affix my signature in presence of two witnesses.

FRED O. C. BROWN.

Witnesses:
ALONZO D. LEAVENWORTH,
JAMES W. WORKMAN.